Jan. 9, 1951 A. B. FOX 2,537,885
BLADE AND COVER BLIND SHUTTER FOR CAMERAS
Filed Aug. 20, 1949

ARTHUR B. FOX
INVENTOR
BY
ATTORNEYS

Patented Jan. 9, 1951

2,537,885

UNITED STATES PATENT OFFICE 2,537,885

BLADE AND COVER BLIND SHUTTER FOR CAMERAS

Arthur B. Fox, Rochester, N. Y., assignor to Eastman Kodak Company, Rochester, N. Y., a corporation of New Jersey Application August 20, 1949, Serial No. 111,464

4 Claims. (Cl. 95—60)

This invention relates to photography and more particularly to shutters for cameras. One object of my invention is to provide a simple and inexpensive camera shutter which can produce a highly efficient exposure. Another object of my invention is to provide a shutter in which the opening and closing times of the shutter are very short and to provide a shutter of the type including a relatively long slot which may be swung past an exposure aperture to make an exposure. Another object of my invention is to provide a molded shutter blade which is light in weight and which has a low moment of inertia and which is so constructed that warping to a damaging extent is avoided. Another object of my invention is to provide a camera shutter in which the driving mechanism is arranged to multiply the movement of the shutter blade relative to the driving action of the spring. A still further object of my invention is to provide a driving mechanism bridging across the shutter blade with the exception of a small area thereof which is used to stop the shutter at either end of its rotational movement. A still further object of my invention is to provide a shutter which can be assembled by relatively unskilled help. Other objects will appear from the following specification, the novel features thereof being particularly pointed out in the claims at the end thereof.

Heretofore simple disc type shutters have ordinarily been rather inefficient. One reason for this is that such shutters have customarily employed a shutter blade which could only be swung through a relatively small angle because of the type of driving spring used for such shutters. It has long been recognized that the so-called hairpin spring is very desirable for shutter operation because it imparts to the shutter a much greater torque the moment it is tripped than during the latter portions of its operating stroke and consequently the large initial torque is quite useful in overcoming the inertia of the shutter blade. However, the total extent of movement which can be obtained with a hairpin spring is comparatively short because as the ends of such a spring separate the power of the spring rapidly decreases. My present application is designed so that the shutter driving mechanism while only moving a comparatively short distance will turn the shutter blade through a relatively large angle such as, for instance, about 230°. Thus the exposure slot in the camera shutter may be made long, the opening and closing times may be made short and the efficiency of the exposure may be quite as high, if not higher than, the efficiency of an expensive between-the-lens type of shutter employing a plurality of pivoted shutter blades. My improved shutter is designed to make a single exposure of approximately 1/50 of a second and high efficiency can be obtained at this speed.

Coming now to the drawings wherein like reference characters denote like parts throughout.

Figure 1:
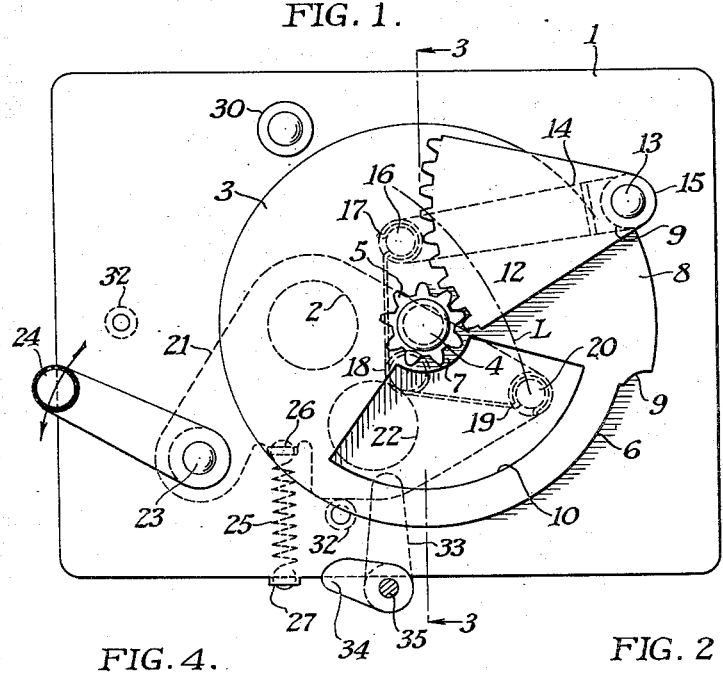
Figure 1 is a front plane view of a shutter constructed in accordance with and embodying a preferred form of my invention, the parts being shown in their normal rest position.
Figure 3:
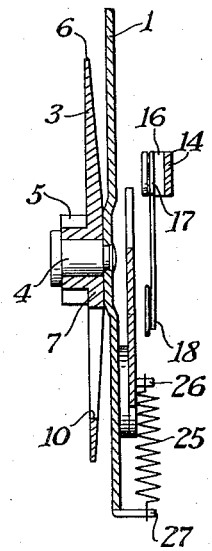
Figure 3 is a vertical section taken on line 3—3 of Figure 1.

My improved camera construction provides a light weight shutter blade which, because of its construction, has a low moment of inertia. This shutter blade and its driving pinion can conveniently be made of moldable material such as opaque nylon because this material, in the form used herein, may be so molded as to retain its shape, because it is light in weight and because it has desirable rebound-prevention characteristics. The shutter is constructed with a gear segment drive bridging over the major part of the shutter blade periphery so that this gear segment may be driven by a lever which in turn is driven by a hairpin spring attached to and operated by a cover blind.

More specifically, as shown in the drawings, the preferred embodiment of such a shutter may consist of a base plate 1 on which the shutter parts may be mounted, this base plate including an exposure aperture 2. A shutter blade 3 may be pivotally attached to the base plate 1 by means of a stud 4 on which the shutter blade 3 is free to turn. A pinion 5 preferably forms a part of the shutter but may be attached thereto if desired. The shutter blade preferably is made so that the periphery 6 is of quite thin material whereas the hub 7 is of much thicker material so that the principal weight of the shutter lies close to its supporting stud 4. A portion of the periphery 6 is extended outwardly at 8 to form an arcuate lug having two curved arcuate ends 9 extending toward the shutter periphery 6. The shutter is provided with an arcuate exposure slot 10 which in the embodiment shown is approximately 110° and is thus comparatively long for a shutter of this type.

The shutter driving mechanism consists of a gear segment 12 carried by a shaft 13 to turn with the shaft and bearing an arm 14 also attached to the shaft 13 to turn with it. This shaft bridges over the periphery 6 of the shutter and preferably passes through the supporting plate 1. The arm 14 and the gear segment 12 with the shaft 13 in effect form an improved driving member U-shaped cross section, the shutter blade 3 passing between the arms of the U-shaped drive member. The shaft 13 may include a sleeve 15 which forms a stop for the stop flange 8 on the shutter thereof by contacting with an arcuate end wall 9. Being of a molded material, I have found that the arcuate wall 9 can be swung against the sleeve 15 with little, if any, rebound so that no additional rebound-preventing device need be employed.

Figures 2, 4:
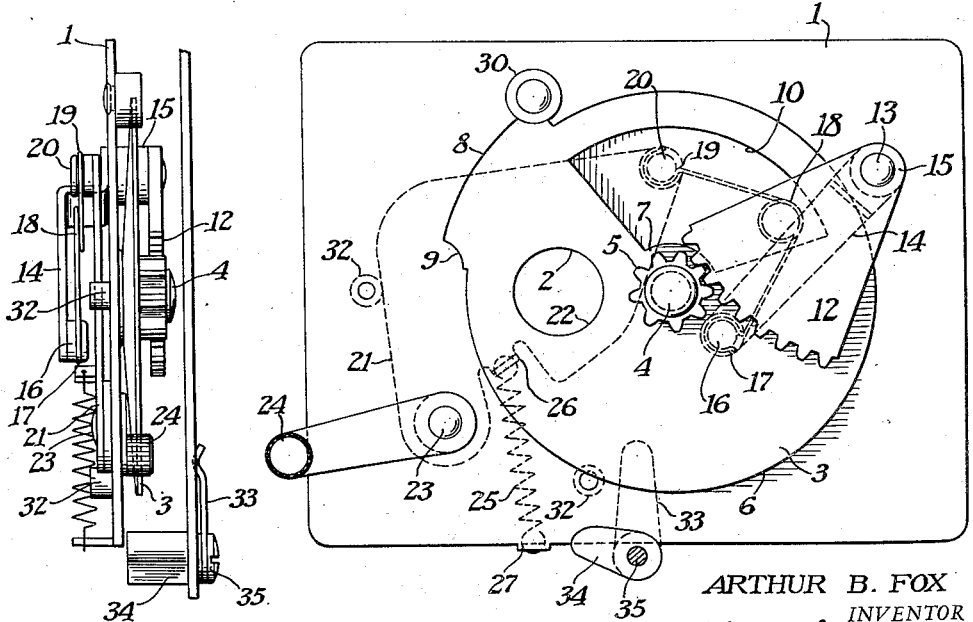
Figure 2 is a view similar to Figure 1 but with the parts shown in the position assumed after an exposure has been completed.
Figure 4 is an end elevation of the shutter shown in Figure 2.

The arm 14 carries a spring support 16 in the form of a pin or lug on which one end 17 of hairpin spring 18 may be anchored. The other end 19 of this spring may be carried by a spring support 20 such as a pin or lug carried by a cover blind 21. This cover blind is apertured at 22 and may turn with a shaft 23 carrying the shutter trigger 24. A spring 25, attached to lug 26 of the cover blind and lug 27 of the supporting plate, is strong enough to overcome the hairpin spring 18 and normally holds the parts in their rest position in Figure 1. To make an exposure the trigger 24 is turned in the direction shown by the arrow in Figure 1, this swings the cover blind 21 upon shaft 23 and swings the spring support 16 through the path indicated by the line L in Figure 1. Thus the hairpin spring 18 is gradually tensioned as the trigger moves downwardly and the spring 25 is extended. When the spring support 20 passes the spring support 16 the hairpin spring 18 is fully tensioned and then quickly released at which time the U-shaped spring—the arm 14—the shaft 13 and the gear segment 12 are rapidly driven causing a clockwise movement of the shutter blade 3 from its Figure 1 to its Figure 2 position. Before the shutter is released the cover blind 21 reaches its Figure 2 position so that the exposure aperture 2 will be uncovered by the aperture 22 in the cover blind. Consequently, the slot 10 of the shutter blade 3 in swinging across the exposure aperture 2 makes an exposure. Since the hairpin spring has an initially high torque, the inertia of the shutter which is comparatively slight is readily overcome and the shutter moves at a relatively uniform and comparatively high speed to open the exposure, condition the exposure and close the exposure. The efficiency at 1/50 of a second is approximately 70%.

When the shutter trigger 24 is released the spring 25, by moving the cover blind back to its Figure 1 position, also moves spring support 20 past spring support 16, thereby again tensioning and releasing the shutter blade. At this time the exposure aperture 2 is covered by the cover blind 21 before the slot 10 swings over the exposure aperture 2. Consequently, no exposure is made in the reverse movement.

I have found that the gear segment and pinion drive has a number of advantages. It smooths out the movement of the shutter. It swings the shutter through a comparatively large arc, in the present instance of 230°, and it requires very little accuracy in manufacture so that the pinion 5 can be molded if desired and gear segment 12 may be punched out rather than cut teeth. This is because the drive movement takes place in one direction only so that there need not be a close-tooth fit and where the pinion 5 is made of a molded material such as nylon the lubricating characteristics of the material are very good, and no additional lubricant is required.

By providing a driving mechanism which bridges over the periphery of the shutter, a stop lug may be formed on the periphery of the shutter which will not pass over the bridge in moving in one direction so that the cylinder 15 may serve as a stop at one extreme of movement of the shutter blade and a second stop 30 may be provided at the other end of the shutter blade as the movement of the blade is to be restricted to such an extent that the single stop 15 will not serve to stop the blade in moving in both directions. Another advantage of this driving mechanism is that it is a simple matter to select—in initially laying out the shutter—a shutter speed which can be accurately repeated at will by changing the ratio of the pinion 5 and the gear segment 12. In the present instance, the ratio shown was selected because 1/50 of a second exposure was desired. For a slower speed a longer slot could be made in the shutter or the travel of the shutter increased by decreasing the size of the pinion and increasing the size of the gear segment. However, for a single exposure camera with the modern high-speed film, 1/50 of a second is a desirable speed as it is fast enough to prevent camera shake which can readily occur even at speeds of a 25th of a second.

The base plate 1 preferably is provided with stop pins 32 which limit the movement of the cover blind 21 in both directions. If a "bulb" exposure is to be made a bulb lever 33 may be used to turn a bulb stop lever 34 to a shaft 35 and into a position to intercept the arcuate stop 9 on the shutter blade 3 while the exposure slot 10 lies over the exposure aperture 2. This is a conventional type of prolonged exposure-making mechanism.

It will thus be seen that there is provided a device in which the several objects of this invention are achieved and which is well adapted to meet the conditions of practical use.

As various improvements may readily be made and as various advantages may be made in the embodiments above set forth, it is to be understood that all the material herein set forth or shown in the accompanying drawings is to be interpreted as illustrative only and not in a limiting sense.

I claim:

1. A camera shutter of the blade and cover blind type comprising an apertured supporting plate, a slotted shutter blade pivoted to the supporting plate with the slot positioned to swing over the aperture, a pinion on the shutter, a driving mechanism for the shutter including a gear segment meshing with the pinion, a shaft beyond the periphery of the shutter carrying the gear segment, an arm attached to the shaft and carrying a support for one end of a spring, a cover blind pivotally mounted on the support and having a support for the other end of a spring, the cover blind extending from the supporting plate to form a manually operable trigger, and driving means comprising said supports for the ends of a spring and a hairpin spring carried thereby for driving the arm and gear segment and the shutter blade to make an exposure, said cover blind having a rest position covering the aperture from which it may be moved by the trigger to compress and release the hairpin spring, whereby movement may be transmitted to the arm to swing the gear segment so that the latter may turn the pinion and the shutter to make an exposure.

2. The camera shutter defined in claim 1 characterized by the driving mechanism for the shutter bridging over a portion of the shutter and having said shaft extending through the support with the gear segment on one side of the support and the arm on the other side of the support and the cover blind and trigger lying on the same side of the support as the arm.

3. The camera shutter defined in claim 1 characterized by the shutter blade consisting of a plastic molded part, the periphery of the shutter being of much less cross section than the center thereof and tapering in thickness from the periphery toward the center whereby said blade may have a low moment of inertia.

4. The camera shutter defined in claim 1 characterized by the shutter blade consisting of a plastic molded part, the periphery of the shutter being of much less cross section than the center thereof and tapering in thickness from the periphery toward the center whereby said blade may have a low moment of inertia, said shutter and said pinion being integrally molded in one piece to provide a bearing of substantial length for the shutter pivot, the shutter speed being controlled by the action of the gear segment driven by the hairpin spring and the pinion.

ARTHUR B. FOX.

REFERENCES CITED

The following references are of record in the file of this patent:

UNITED STATES PATENTS

| Number | Name | Date |
|---|---|---|
| 446,045 | Whitney | Feb. 10, 1891 |
| 1,383,395 | Folmer | July 5, 1921 |
| 2,199,998 | Hutchison | May 7, 1940 |